No. 738,001. PATENTED SEPT. 1, 1903.
J. COCHRAN.
CASING HEAD FOR OIL WELLS.
APPLICATION FILED MAR. 30, 1903.
NO MODEL.

Witnesses

Inventor
John Cochran.
By Wilkinson & Fisher.
Attorneys.

No. 738,001.                                                              Patented September 1, 1903.

UNITED STATES PATENT OFFICE.

JOHN COCHRAN, OF BEALLS MILLS, WEST VIRGINIA.

CASING-HEAD FOR OIL-WELLS.

SPECIFICATION forming part of Letters Patent No. 738,001, dated September 1, 1903.

Application filed March 30, 1903. Serial No. 150,237. (No model.)

*To all whom it may concern:*

Be it known that I, JOHN COCHRAN, a citizen of the United States, residing at Bealls Mills, in the county of Lewis and State of West Virginia, have invented certain new and useful Improvements in Casing-Heads for Oil-Wells; and I do hereby declare the following to be a full, clear, and exact description of the invention, such as will enable others skilled in the art to which it appertains to make and use the same.

My invention relates to casing-heads for oil or other wells; and the object of my invention is to make a simple, cheap, and effective casing-head provided with easily-operated means for accurately controlling the flow of the oil or other fluid through said head.

With this object in view my invention consists of the construction and combination of parts, as hereinafter described and claimed.

Figure 1:
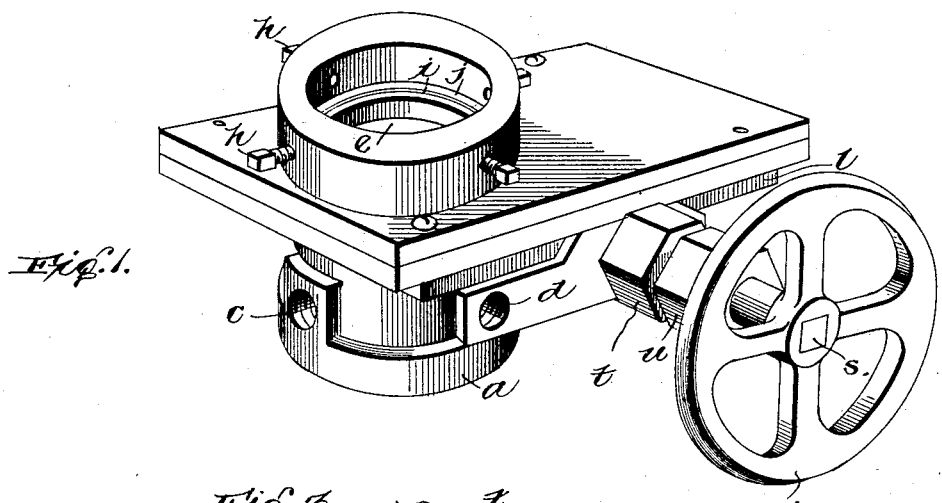
Figure 3:
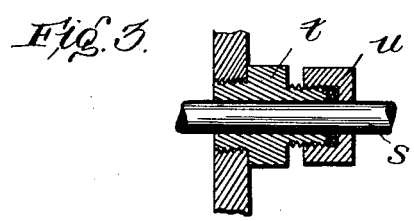
Figure 2:
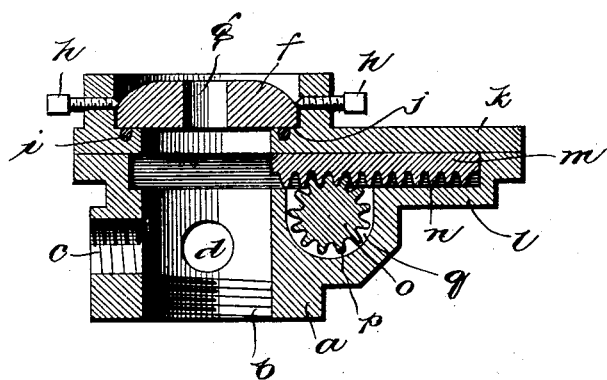

In the accompanying drawings, Figure 1 is a perspective view of my improved casing-head, the tubing-ring being removed. Fig. 2 is a cross-section of the same, and Fig. 3 is a detail view showing the means for preventing leakage.

$a$ represents the body of the casing-head, provided with a screw-thread $b$ for attachment to the well-tube.

$c$ and $d$ represent branch openings, screw-threaded for the reception of pipes.

$e$ represents the main opening in the upper part of the casing-head, which is partially closed by the tubing-ring $f$, which is provided with a central aperture $g$. This tubing-ring is held in position in the casing-head by screws $h$. A packing $i$, of rubber or suitable material, is located in a groove in the casing-head for the purpose of preventing leaking under the tubing-ring $f$. Preferably this packing projects slightly above the internal flange $j$ of the casing-head when the tubing-ring is removed, so that a tight joint will be provided.

At one side of the casing-head are provided extensions $k$ and $l$, within which the cut-off valve $m$ is confined. This valve is in the shape of a flat plate provided with downwardly-projecting teeth $n$, the valve $m$ being, in fact, a wide rack. To operate this valve, a pinion $o$, provided with teeth $p$, is provided which pinion is located in a recess $q$ in the casing-head. The pinion is operated by means of a hand-wheel $r$, located on the shaft $s$ thereon, which shaft projects outside of the casing-head. A hollow projecting piece $t$, provided with beveled-off portions, so that it may be turned by a wrench, is screwed into the side of the casing-head, within which projection the shaft $s$ is located. On this projection is a nut $u$, which is screw-threaded on the outer part of said projection, and a packing is preferably used between said nut and said projection to prevent leakage. The valve $m$ being wholly contained within the casing-head and this valve, as well as the pinion $o$, being provided with long teeth or gears, renders the valve capable of easy operation without leakage, thus permitting an accurate adjustment of the same, so that the flow of the oil may be easily and efficiently regulated. As this valve moves at right angles to the flow of the oil, the pressure of the oil tends to hold it tightly against the upper portion of the casing-head, thus holding the valve in any adjusted position without any specific means for so doing.

Having thus described my invention, what I claim as new, and desire to secure by Letters Patent of the United States, is—

The combination of a casing-head composed of two separate parts the one fitting above the other, said parts being fastened together, both of said parts being provided with a vertically-arranged perforation, and the lower of said parts being cut away for the passage of a rack, and the upper part fitting over the lower part so as to leave a recess into which said rack may slide, with a perforated tube-ring secured in the upper part of said casing-head, screws securing said tube-ring in place, a packing between said tube-ring and the upper part of said casing-head, a rack mounted between the parts of said casing-head, said rack being provided with downwardly-extending teeth, a toothed pinion mounted in a recess in the lower part of said casing-head and engaging with said rack, a hand-wheel for operating said pinion, and means for preventing the oil from leaking out around the shaft of said pinion, substantially as described.

In testimony whereof I affix my signature in presence of two witnesses.

JOHN COCHRAN.

Witnesses:
ANTON BEALL,
G. W. BEALL.